Feb. 8, 1927.
L. L. FOSS
1,617,245
FAR DISTANT WEIGHING SCALE WITH IMPROVED HOPPER SUPPORTING MEANS
Filed April 21, 1926    2 Sheets-Sheet 1
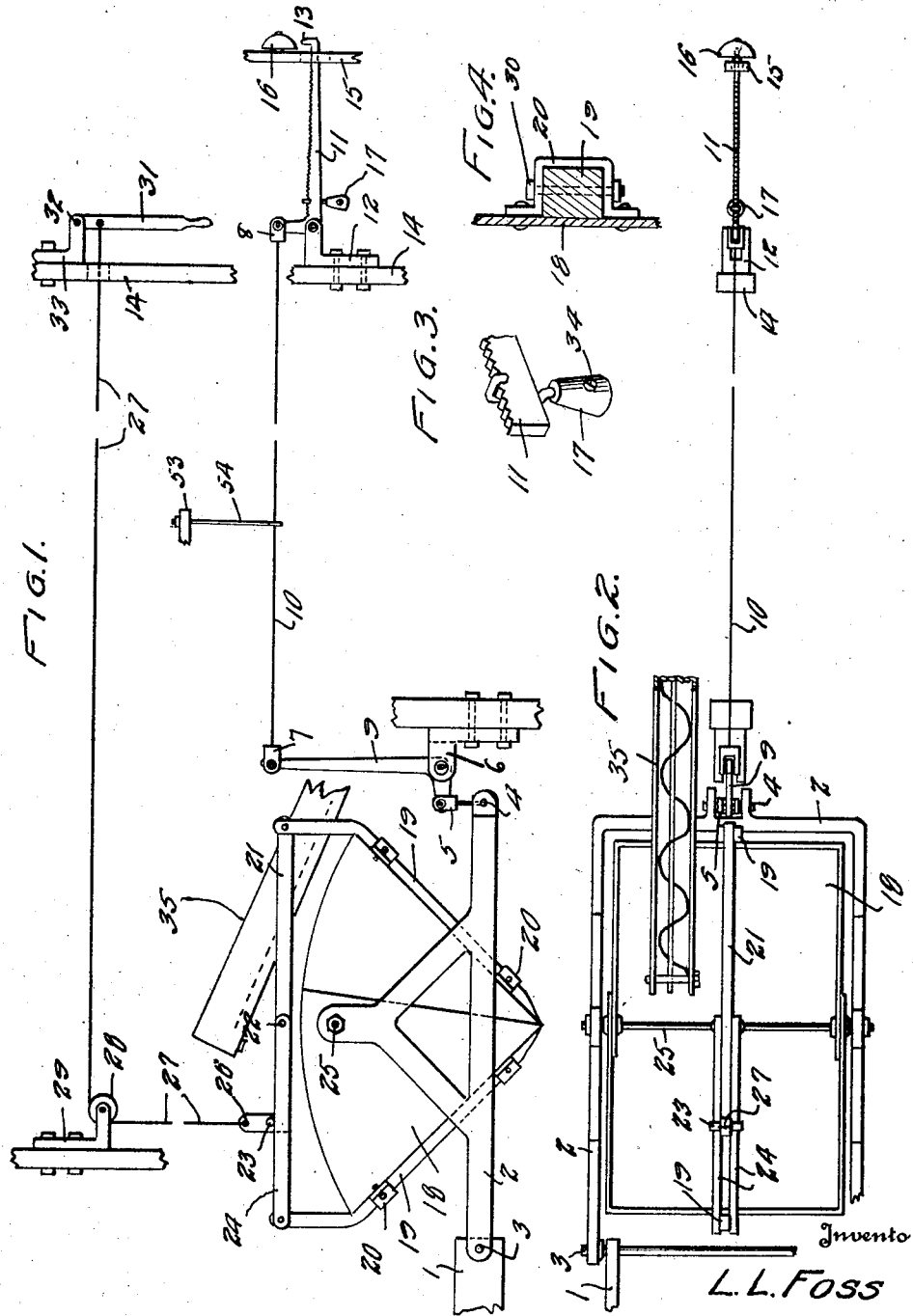

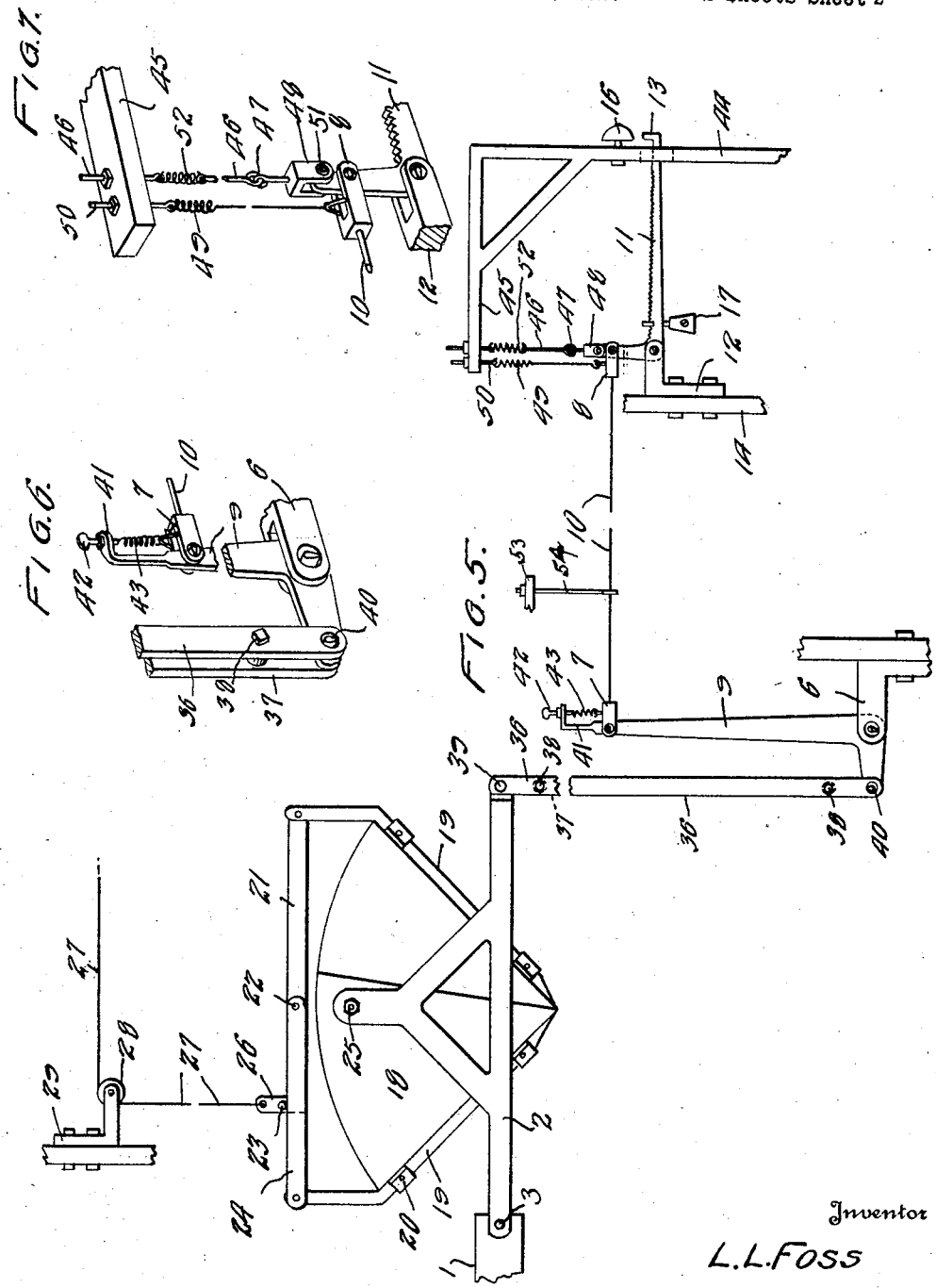

Patented Feb. 8, 1927.

1,617,245

UNITED STATES PATENT OFFICE.

LELAND L. FOSS, OF PULASKI, GEORGIA.

FAR-DISTANT WEIGHING SCALE WITH IMPROVED HOPPER-SUPPORTING MEANS.

Application filed April 21, 1926. Serial No. 103,643.

The object of my invention is to provide scales adapted to weigh material at a considerable distance from the weighing beam; to provide improved means for supporting the hopper and operatively connecting it to the weighing beam, and to make other improvements in the details of the mechanism, as disclosed in the accompanying dawings, in which—

Figure 1 is a side elevation of my invention;

Fig. 2 is a top plan view of same;

Fig. 3 is a detail perspective view of the weight;

Fig. 4 is a section through member 19, showing the function of clips 20;

Fig. 5 is a side elevation of a modified and improved form of my invention;

Fig. 6 is a detail perspective view of a portion of the mechanism shown in Fig. 5; and Fig. 7 is an enlarged detail perspective view of another portion of the mechanism illustrated in Fig. 5.

Like numerals indicate like parts in each of the several views.

Referring to the accompanying drawings, I provide a suitable foundation or supporting element 1 on which supporting beams 2 are operatively mounted by means of pivot 3. Beams 2 carry a hopper support rod 25, which supports the hopper 18. A link 4 having a clevis 5 operatively connects the free end of beams 2 with the beam 9, which is pivotally mounted on bracket 6. A clevis 7 on the other end of the L-shaped beam 9 is attached to a cable 10, the other end of which cable is attached to the clevis 8 on the short arm of the scale beam 11. Scale beam 11 is pivotally mounted on the bracket 12, bolted to a suitable support 14. Scale beam 11 is provided with an upturned end 13, which functions as a clapper to sound the gong 16, which is mounted on a suitable support 15, such as a wall of a building into which the scale is positioned, the hopper being placed at some far distant point where the material to be weighed will be kept.

I provide clevis 20 fastened to the walls of hopper 18, as shown in Fig. 4, and also fastened to the hopper supporting beams 19 by bolts 30, as shown in Fig. 4.

Hopper 18 consists of a pair of pivoted hopper sections, to which the supporting beams 19 are affixed and which sections are adapted to swing apart at the bottom to release the contents of the hopper when the hopper discharging mechanism is operated. I provide hopper lock bars 21 and 24, pivotally mounted on the upper ends of hopper support beams 19 and pivotally connected to each other by the bolt or rivet 22, as shown in Fig. 1. Lock bar 21 is provided with an upturned end 26, which carries opposite stop lugs 23 adapted to engage the pair of bars 24 and lock the hopper in closed position until released by the cable 27, which is threaded over a pulley 28 carried by bracket 29, the cable 27 being attached to a hand lever 31, pivotally mounted at 32 on a bracket 33, which is attached to the support or wall 14. The scale beam 11 carries a suitable weight 17, which is hollow and is provided with a removable screw 34, through which shot may be inserted to adjust or regulate the weight element for accurate weighing. I provide a suitable conveyor 35, preferably one having a spiral screw, by means of which material may be fed or supplied to the hopper 18. The weight element 17 may be set to the desired figure on the scale beam 11, indicating the desired weight of material to be registered on the scales. Material may be fed through conveyor 32 through the hopper until the desired weight is reached, when the weight exerted on beams 2, link 4, beam 9, cable 10 and scale beam 11 will actuate the scale and cause its end 13 to sound the gong and remind the operator to move the lever 31 and thus discharge the contents of hopper 18, whereupon a new load will be released through the opening at the end of the spiral conveyor 35 into the hopper.

I may provide one or more links or hooks 54 to support the cable 10 if the cable is of such length as to make such support desirable. The link 54 is suspended from any suitable support 53, as diagrammatically indicated in Fig. 5.

Referring to Figs. 5, 6 and 7, illustrating a modified and improved form of my invention, I provide, in addition to the mechanism above described, a vertically disposed link or bar 36, pivotally connected at 39 to beam 3 and depending therefrom.

I provide long links 36 and 37, pivotally connected at 40 to the L-shaped beam 9 and at 39 to beam 2. They are suitably braced to each other by bolt 38. I provide L-shaped beam 9 with a bracket extension 41, in which is mounted a thumb screw 42, attached to a suitable spring 43, which is suitably attached to and supports the clevis 7. Similarly, attached to the clevis 8 is a suitable spring 49, attached to a suitable screw or bolt 50, as shown in Figs. 5 and 7. I provide a link 46, suspended from the bracket or support 45 and connected to a link 47, which is attached to the clevis 48. Links 46 have a coiled spring 52 interposed, of sufficient tension to just support the scale beam 11 in proper relation on bracket 12 to insure accurate weight, as shown in Fig. 7. The provision of a long link 36 and 37 makes it possible to position the weighing beam at a relatively lower position in the gin house, making it more convenient to the operator. The springs 43, 49 and 52 oppose the effect of gravity on clevises 7 and 8 and beam 11 to insure proper operation of the device, and it is also within the contemplation of my invention to support cable 10 by a swinging ring through which cable 10 passes, to prevent traction against cable 10, so that accurate weight can be had. The apparatus operates in substantially the same manner as the apparatus disclosed in Figs. 1 to 4, inclusive and described above.

I may use any convenient means for a take-up or to lengthen the wire or cable 10 for adjusting the device to take care of variations in length, due to differences in temperature.

What I claim is:

1. In scales of the type described, the combination of a hopper, beams supporting the hopper said beams being pivotally mounted at one end to a stationary supporting element, a pivotally mounted L-shaped beam, a link connecting the free end of the hopper supporting beams to the short arm of the L-shaped beam, a cable operatively connected to the end of the long arm of the L-shaped beam and a scale beam to which the other end of the cable is operatively connected.

2. In scales of the type described, the combination of a hopper, beams supporting the hopper said beams being pivotally mounted at one end to a stationary supporting element, a pivotally mounted L-shaped beam, a link connecting the free end of the hopper supporting beams to the short arm of the L-shaped beam, a cable operatively connected to the end of the long arm of the L-shaped beam, a scale beam to which the other end of the cable is operatively connected, a scale beam having an upturned end, a gong arranged to be sounded by the upturned end of the scale beam when the weight of material in the hopper exceeds that for which the weight of the scale beam is set.

3. In apparatus of the class described, the combination of hopper supporting beams pivotally mounted at one end of a stationary supporting element, a transverse rod connecting the said beams and pivotally supporting the sections of a hopper, hopper supporting beams bolted to the walls of the hopper, a single arm pivotally connected to the upper end of one of the aforesaid beams said arm having an upturned end, a pair of arms pivotally connected to the upper end of the opposed hopper supporting beams and also to the first mentioned arm, stop lugs on the upturned end of the scale beam and positioned to lock the said arm in parallel relation to releasably fasten the hopper in its normal closed position, a cable attached to the upturned end of the first mentioned arm, an operating hand lever positioned at a distance from the hopper to which the cable is operatively connected, and a scale beam operatively connected with the hopper supporting beams said connecting means including a cable to permit of far distant weighing of material.

4. In apparatus of the class described, the combination of hopper supporting beams pivotally mounted at one end of a stationary supporting element, a transverse rod connecting the said beams and pivotally supporting the sections of a hopper, hopper supporting beams bolted to the walls of the hopper, a single arm pivotally connected to the upper end of one of the aforesaid beams said arm having an upturned end, a pair of arms pivotally connected to the upper end of the opposed hopper supporting beams and also to the first mentioned arm, stop lugs on the upturned end of the aforesaid single arm and positioned to lock said arm in parallel relation to releasably fasten the hopper in its normal closed position, a cable attached to the upturned end of the first mentioned arm, an operating hand lever positioned at a distance from the hopper to which the cable is operatively connected, a scale beam operatively connected with the hopper supporting beams said connecting means including a cable to permit of far distant weighing of material, an audible signal arranged to be sounded by the movement of the scale beam, the said scale beam being positioned below the hopper operating lever.

5. In scales of the type described, the combination of a hopper, spaced hopper supporting beams, said beams being pivotally mounted at one end to a stationary supporting element, a pivotally mounted L-shaped beam, a relatively long link pivotally connected at one end to the short arm of the L-shaped beam and at the other end to the free end of the hopper supporting beams, a cable operatively connected to the end of the long arm of the L-shaped beam, and a scale beam to which the other end of the cable is operatively connected.

6. In combination with the mechanism described in claim 5, a clevis connecting the cable to the L-shaped beam, a second clevis connecting the other end of the short arm of the scale beam, and resilient means operatively connected to and supporting each of the clevises in a normally horizontal position to counteract the effect of gravity.

7. In scales of the type described, the combination of a hopper, hopper supporting beams, a pivotally mounted L-shaped beam, a pair of links operatively connected to the free end of the hopper supporting beams and to the short arm of the L-shaped beam to operatively connect those members, a cable operatively connected with the long arm of the L-shaped beam, a pivotally mounted scale beam with which the other end of the cable is operatively connected, said connecting means including means for counteracting the effect of the force of gravity on the connecting elements, and a gong disposed in position to be sounded by the operation of the scale beam.

LELAND L. FOSS.